(12) United States Patent
Sevigny

(10) Patent No.: US 9,959,905 B1
(45) Date of Patent: May 1, 2018

(54) METHODS AND SYSTEMS FOR 360-DEGREE VIDEO POST-PRODUCTION

(71) Applicant: Torus Media Labs Inc., Toronto (CA)

(72) Inventor: Michel Sevigny, Toronto (CA)

(73) Assignee: Torus Media Labs Inc., Toronto (CA)

( * ) Notice: Subject to any disclaimer, the term of this patent is extended or adjusted under 35 U.S.C. 154(b) by 0 days. days.

(21) Appl. No.: 15/588,073

(22) Filed: May 5, 2017

(51) Int. Cl.
| | | |
|---|---|---|
| *G06T 3/00* | (2006.01) | |
| *G06T 7/00* | (2017.01) | |
| *G06T 19/20* | (2011.01) | |
| *G11B 27/031* | (2006.01) | |
| *G06T 7/11* | (2017.01) | |
| *G06T 7/30* | (2017.01) | |

(52) U.S. Cl.
CPC .............. *G11B 27/031* (2013.01); *G06T 7/11* (2017.01); *G06T 7/30* (2017.01); *G06T 2207/10028* (2013.01)

(58) Field of Classification Search
CPC ......... G09G 2340/12; G09G 2340/125; G09G 2340/14; G09G 2354/00; G09G 5/00
See application file for complete search history.

(56) References Cited

U.S. PATENT DOCUMENTS

| | | | |
|---|---|---|---|
| 2006/0187305 A1* | 8/2006 | Trivedi .............. | G06K 9/00234 348/169 |
| 2008/0024523 A1 | 1/2008 | Tomite et al. | |
| 2011/0029903 A1 | 2/2011 | Schooleman et al. | |
| 2012/0113144 A1 | 5/2012 | Adhikari et al. | |

OTHER PUBLICATIONS

Enrico Gobbetti and Fabio Marton, "Layered Point Clouds," Eurographics Symposium on Point-Based Graphics (2004).*
Adobe, "Adobe After Effects CS6 Classroom in a Book the official training workbook from Adobe Systems," 2012, Adobe Systems Incorporated and its lincensors. p. 8-28, 52-53, 118-121, 164-167, 271-272, 302-305 and 315-316.*
Life in 360, "Add Text to Your 360 Videos in Premiere," Ben Claremont, Published on Nov. 13, 2016 on Youtube. https://www.youtube.com/watch?v=R0zA-yFBpwc.*
Adobe After Effects CC; Create incredible motion graphics and visual effects; http://www.adobe.com/ca/products/aftereffects.html?sdid=KKQOW&kw=semgeneric&mv . . . Copyright 2017 Adobe Systems Incorporated, retrieved May 4, 2017.

* cited by examiner

*Primary Examiner* — Sing-Wai Wu
(74) *Attorney, Agent, or Firm* — Ridout & Maybee LLP

(57) ABSTRACT

In accordance with example embodiments, the method and system for 360-degree video post-production generally makes use of points of view (POVs) to facilitate the 360-degree video post-production process. A POV is a rectilinear subset view of a 360-degree composition based on a particular focal length, angle of view, and orientation for each frame of the 360-degree composition. Video post-production editing can be applied to a POV by the user, using rectilinear video post-production methods or systems. The rectilinear video post-production editing done on the POV is integrated back into the 360-degree environment of the 360-degree composition. In accordance with example embodiments, the method and system for 360-degree video post-production comprises identifying a point of view in a 360-degree composition; applying video post-production editing to the point of view; and aligning a new layer containing the video post-production editing with the point of view in the 360-degree composition.

19 Claims, 13 Drawing Sheets

METHODS AND SYSTEMS FOR 360-DEGREE VIDEO POST-PRODUCTION

CROSS-REFERENCE TO RELATED APPLICATION(S)

None.

TECHNICAL FIELD

Example embodiments relate generally to virtual reality and augmented reality, and in particular for video post-production for virtual reality and augmented reality.

BACKGROUND

Video post-production refers to editing of videos following the shooting or generation of videos. Video post-production can include visual effects, video stabilization, modification (editing) of objects, and insertion of objects.

Video post-production of 360-degree videos has introduced a number of new challenges, which make it difficult to use some existing tools, which were developed for post-production of 2D rectilinear videos.

Additional difficulties with existing systems may be appreciated in view of the Detailed Description of Example Embodiments, herein below.

SUMMARY

In accordance with an example embodiment, the method and system for 360-degree video post-production generally makes use of points of view (POVs) to facilitate the 360-degree video post-production process. A POV is a rectilinear subset view of a 360-degree composition based on a particular focal length, angle of view, and orientation for each frame of the 360-degree composition. Video post-production editing can be applied to a POV by the user, using rectilinear video post-production methods or systems. The rectilinear video post-production editing done on the POV is integrated back into the 360-degree environment of the 360-degree composition.

In accordance with an example embodiment, the method and system for 360-degree video post-production generally includes identifying a point of view in a 360-degree composition; applying video post-production editing to the point of view; and aligning a new layer containing the video post-production editing with the point of view in the 360-degree composition.

In accordance with an example embodiment, the method and system for 360-degree video post-production generally includes identifying a point of view in a 360-degree composition; applying tracking to the point of view to identify tracking information consisting of one or more point cloud layers and a tracked camera layer; linking the point cloud layer to the tracked camera layer; and aligning the tracked camera layer with the point of view in the 360-degree composition.

In accordance with an example embodiment, the method for 360-degree video post-production, the method being performed by at least one processor, generally includes identifying a point of view comprising an identified rectilinear view of a 360-degree composition; applying video post-production editing to the point of view; creating one or more layers containing the video post-production editing; and aligning the one or more layers with the identified point of view in the 360-degree composition.

In accordance with an example embodiment, the method for 360-degree video post-production further includes repeating the method of identifying a point of view comprising an identified rectilinear view of a 360-degree composition; applying video post-production editing to the point of view; creating one or more layers containing the video post-production editing; and aligning the one or more layers with the point of view in the 360-degree composition with one or more same or different points of view.

In accordance with an example embodiment, the video post-production editing comprises importing media of a media file aligned with the identified point of view. In accordance with an example embodiment, the media file is a 360-degree media file. In accordance with an example embodiment, the video post-production editing on the point of view comprises tracking the imported media from the point of view to identify tracking information comprising one or more point cloud layers and a tracked camera layer; and linking the one or more point cloud layers to the tracked camera layer.

In accordance with an example embodiment, the video post-production editing on the point of view comprises tracking the point of view to identify tracking information comprising one or more point cloud layers and a tracked camera layer; and linking the one or more point cloud layers to the tracked camera layer.

In accordance with an example embodiment, the method for 360-degree video post-production further comprises orienting the 360-degree composition with the inversion of the orientation of the tracked camera layer; and updating the orientation of the identified point of view to match the orientation of the tracked camera layer after the tracked camera layer is aligned with the identified point of view.

In accordance with an example embodiment, the method for 360-degree video post-production further comprises selecting one or more points of view in addition to the identified point of view; calculating the difference in orientation between the one or more selected points of view and the identified point of view before the identified point of view is updated to match the orientation of the tracked camera layer; and updating the orientation of the one or more selected points of view to match the addition of the calculated difference and the orientation of the tracked camera layer after the tracked camera layer is aligned with the identified point of view.

In accordance with an example embodiment, the method for 360-degree video post-production further comprises a memory for storing the 360-degree composition.

In accordance with an example embodiment, the method for 360-degree video post-production further comprises displaying an interface screen for the 360-degree composition, the interface screen configured to display an omni directional camera viewer that is configured to display a rectilinear view of the 360-degree composition as a consequence to orientation navigating through the omni directional camera viewer; and receiving selection of the displayed rectilinear view, wherein the identified rectilinear view is the selected displayed rectilinear view. In accordance with an example embodiment, said orientation navigating and/or said receiving selection are controlled using an input interface device. In accordance with an example embodiment, the displayed rectilinear view is also the consequence of navigating one or more of the angle of view and focal length.

In accordance with an example embodiment, the displayed rectilinear view is generated by identifying and displaying a subset of the 360-degree composition corresponding to the displayed rectilinear view In accordance with an example embodiment, the identified point of view includes a particular focal length, angle of view, and orientation of the 360-degree composition.

In accordance with an example embodiment, the identified point of view is selectable from any viewing angle. In accordance with an example embodiment, the identified point of view is off-angle from a rectilinear viewing angle.

In accordance with an example embodiment, the method for 360-degree video post-production further comprises rendering a new 360-degree video file which renders the 360-degree composition together with the one or more layers. In accordance with an example embodiment, the new 360-degree video is aligned with the identified point of view or a different point of view. In accordance with an example embodiment, the new 360-degree video file is stored in memory or sent to another device, server, or cloud server.

In accordance with an example embodiment, the video post-production editing comprises generating a sub-composition of the identified point of view and applying rectilinear post-production editing to only the sub-composition.

In accordance with an example embodiment, the sub-composition of the identified point of view is generated by flattening all layers in the 360-degree composition into a single sub-composition layer.

In accordance with an example embodiment, the video post-production editing comprises adding a new solid color layer or adjustment layer sized to overlay the identified point of view.

In accordance with an example embodiment, the system for 360-degree video post-production comprises memory; an output interface device comprising a display; an input interface device; a processor operably coupled to the memory, the output interface device and the input interface device, the processor for executing instructions stored in the memory which, when executed, causes the processor to perform a method of 360-degree video post-production.

In accordance with an example embodiment, the system for 360-degree video post-production comprises a non-transitory computer readable medium comprising instructions for 360-degree video post-production and executable by one or more processors, the instructions comprising instructions for performing a method of 360-degree video post-production.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

A number of tools have been developed to assist in video post-production of rectilinear videos. For example, there are a number of different tools that assist with adding visual effects into rectilinear videos. Visual effects include compositing of videos or stills, addition of computer generated imagery, color correction, and other manipulations of the video as originally shot. Generally, visual effects can be used to add or remove aspects to a video after the original shot. An example of video composition is the addition of an actor from a video filmed in a green screen or blue screen environment into a different video. Computer generated imagery, which can include animated objects, can also be added into a video. Some example tools for adding visual effects into rectilinear videos include Adobe™ After Effects™, Maxon Cinema4D™, The Foundry™ Nuke™, Autodesk™ 3D Studio Max™ Autodesk™ Maya™ SideFX™ Houdini™, and Blender™.

One method of assisting in video post-production is tracking. Motion tracking can be used to track scenes and objects in videos to assist in adding visual effects that follow or are affected by the scene or an object. By tracking an object, the tracking tools are able to determine or at least approximate an object's position and orientation relative to the camera. Objects in a video can be tracked in two dimensions or three dimensions. Tools that assist in tracking for videos include Adobe™ After Effects™ PFTrack™, Boujou™, 3D Equilizer™ and Syntheyes™.

Tracking can also be used to solve the camera. When solving a camera, typically a stationary object or objects in the video are tracked, to determine the position and orientation relative to the camera throughout the video. Since the object is known to be stationary, any changes in position and orientation relative to the camera can be understood to be a result of camera movement. This information can be used to solve the camera, meaning the tracking tool will have identified the camera's position, focal length, angle of view and orientation throughout the video. A solved camera can be used to stabilize footage, for example by compensating for any changes in camera orientation. A solved camera can also be used to assist in adding visual effects to a specific location within a scene.

There has been a growing interest in 360-degree videos. Unlike rectilinear videos, 360-degree video recordings record in multiple directions or every direction at the same time. 360-degree videos are often viewed using a head-mounted display, which allows a viewer to look around in all directions while watching the video. 360-degree videos can also be viewed using 360-degree projectors or on a display that allows the user to change the view direction.

Figure 9:
FIG. 9 is a screen shot showing an example of an equirectangular map of a frame of a 360-degree video.
Figure 10:
FIG. 10 is a screen shot showing an example of a cube map of a frame of a 360-degree video.

There are a number of map types, also referred to as projections, which are used for recording a 360-degree video or image or displaying a 360-degree video or image in a flat, non-360-degree environment. Common examples are the equirectangular map 900, an example of which is shown in FIG. 9, which projects the 360-degree video onto a flat rectangular view; and the cube map 1000, an example of which is shown in FIG. 10, which projects the 360-degree video onto 6 square panels that represent the six inside faces of a cube which, when being viewed in a 360-degree environment, are arranged to surround the video viewer's perspective. There are different arrangements of the 6 square panels of a cube map 1000, for example the H-cross or V-cross.

Figure 12:
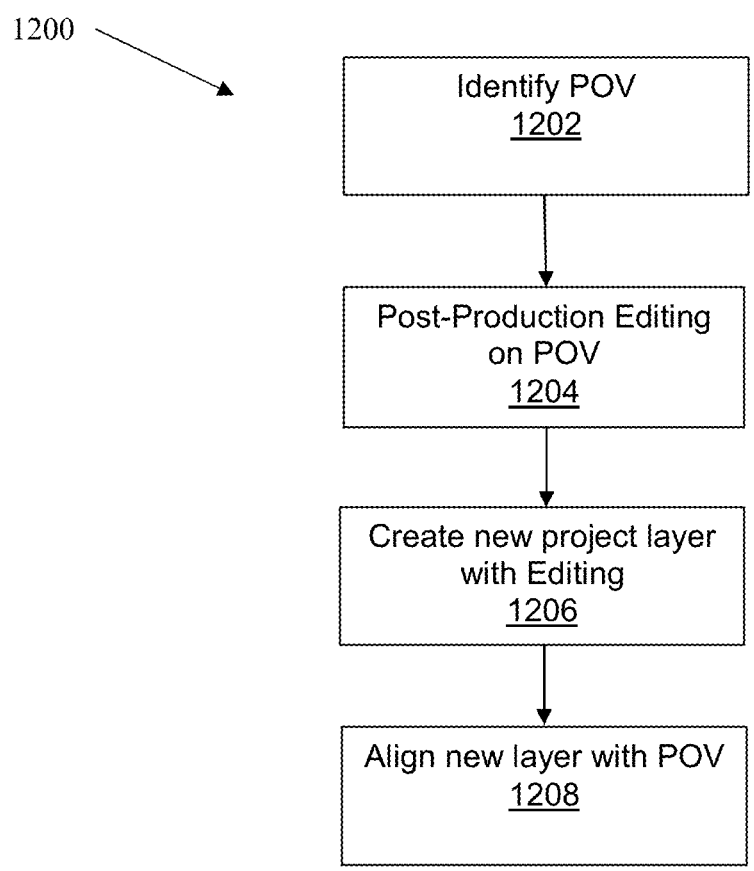
FIG. 12 is a flow diagram of a method for 360-degree video post-production, in accordance with an example embodiment.

In accordance with example embodiments, the method and system for 360-degree video post-production generally makes use of points of view (POVs) to facilitate the 360-degree video post-production process. A POV is a rectilinear subset view of a 360-degree composition based on a particular focal length, angle of view, and orientation for each frame of the 360-degree composition. Referring is made to FIG. 12, which provides a flowchart of basic steps in a method for 360-degree video post production 1200 in accordance with an example embodiment. In accordance with an example embodiment, a POV is identified 1202 and then video post-production editing is applied to the POV 1204 by the user, using rectilinear video post-production methods or systems. The rectilinear video post-production editing done on the POV is integrated back into the 360-degree environment of the 360-degree composition. In accordance with an example embodiment, a new layer is created 1206 which includes the rectilinear post-production editing. In accordance with an example embodiment, the new layer is aligned with the identified POV 1208.

In accordance with at least some an example embodiment, rectilinear tracking methods or systems can be used on a POV. The rectilinear tracking information is then applied in the 360-degree context of the 360-degree composition. In accordance with an example embodiment, the tracking done on a particular POV is used to solve the camera for the 360-degree composition. In accordance with an example embodiment, the orientation of the 360-degree camera can be used to stabilize the 360-degree composition. A stabilized 360-degree composition can be created by canceling out the orientation changes of the 360-degree camera.

Figure 1:
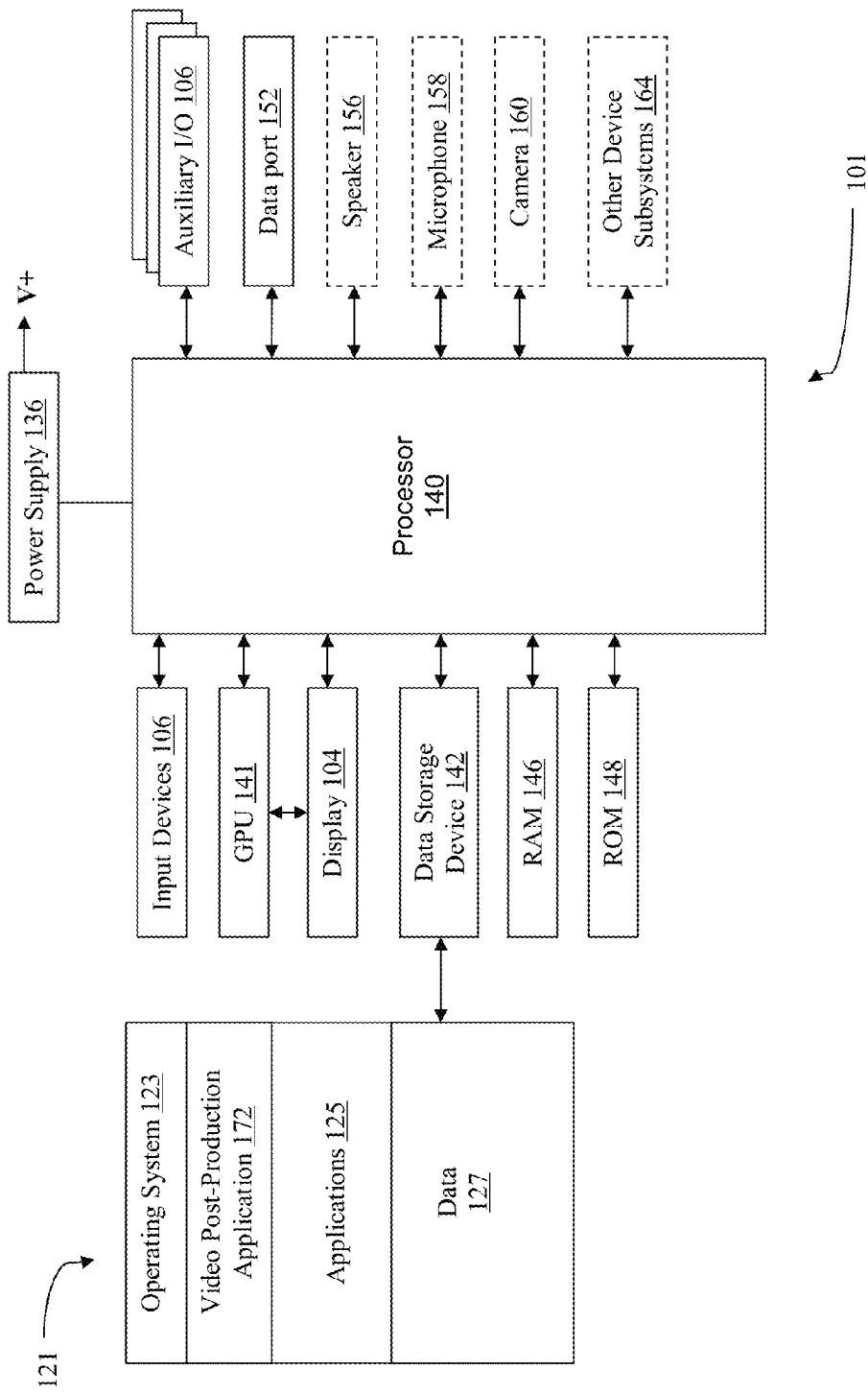
FIG. 1 shows a block diagram illustrating a 360-degree video post-production system in accordance with an example embodiment.

Reference is made to FIG. 1 which shows a block diagram illustrating a 360-degree video post-production system 101 in accordance with an example embodiment. In accordance with an example embodiment, the system 101 can be implemented on a computer, the system 101 can be a customized system dedicated to 360-degree video post-production, or the system 101 may be implemented in a distributed manner, with parts of the system 101 implemented on different physical devices, such as those skilled in the art will understand is the case in cloud computing environments.

In accordance with an example embodiment, the system 101 includes a controller comprising at least one processor 140 (such as a microprocessor) which controls the overall operation of the system 101. The processor 140 interacts with device subsystems which may include one or more displays (screens) 104 which can be a computer monitor such as a liquid crystal display (LCD) screen or other displays such as a television screen or projector; input devices 106 such as a keyboard, graphic tablet or mouse; one or more data storage devices 142; random access memory (RAM) 146; and read only memory (ROM) 148. In accordance with an example embodiment, the data storage devices 142 can any computer readable medium or a combination of different computer readable mediums. In accordance with an example embodiment, the system 101 may include one or more graphic processing units (GPU) 141 in addition to the at least one processor 140. A GPU 141 may have its own volatile memory, such as RAM. One or more of the displays 104 may interact directly with the GPU 141. In accordance with an example embodiment, the system 101 may also include one or more auxiliary input/output (I/O) subsystems 150 and one or more data ports 152 such as a serial data port, such as a Universal Serial Bus (USB) data port.

In accordance with an example embodiment, the auxiliary input/output (I/O) subsystems 150 and data ports 152 can be used to connect peripherals to the system 101. In accordance with an example embodiment, the auxiliary input/output (I/O) subsystems 150 may comprise an external communication link or interface, for example, an Ethernet connection. The auxiliary I/O subsystems 150 or data ports 152 may also be used to connect removable memory to the system 101.

In accordance with an example embodiment, the system 101 may also include one or more speakers 156; one or more microphones 158; and other device subsystems generally designated as 164. In accordance with an example embodiment, the speakers 156, microphones 158, or other device subsystems 164 may be connected directly to the processor 140 or may be connected through an auxiliary I/O subsystem 150 or a data port 152.

In accordance with an example embodiment, the speaker 156 may comprise speakers configured in stereo or multi-directional, and the microphone 158 may be stereo or multi-directional. For example, real-world directional sound can be recorded using a multi-directional microphone 158. When a 360 video is played, the associated sound can then be output from the speaker 156 from the recorded sound, and/or other soundtracks and/or sound that is edited, added, or removed, for example.

In accordance with an example embodiment, the system 101 can include one or more digital cameras 160. The camera(s) 160 may be separable from or integrated within the system 101. Camera(s) 160 include a lens configuration and associated software application(s) for detecting and capturing real-world images or video. Integrated cameras can store real-world images or videos into a data storage device 142 or RAM 146. Separable cameras 160 may have internal memory (not shown) for storing real-world images or videos. In accordance with an example embodiment, when a separable camera 160 is reconnected to the system 101, for example through an I/O subsystem 150 or serial port 152, the real-world image or video files stored on the camera's 160 internal memory can be downloaded into the system's data storage devices 142 or RAM 146.

In accordance with an example embodiment, one or more of the cameras 160 can be a 360 camera that records 360-degree footage, also referred to as an omnidirectional camera. Examples of types of 360 cameras include dual-lens cameras; 360 cameras consisting of multiple cameras installed in a rig whose footage is stitched together into 360-degree footage; rotating cameras; and cameras which use 360 degree lenses. Examples of 360 cameras include the GoPro™ Omni™, GoPro™ Odyssey™ Nokia™ OZO™, Facebook™ Surround360™, and Kodak™ Pixpro™. In accordance with an example embodiment, once footage from the camera 160 is imported into the system 101, it is no longer necessary to keep the camera 160 connected to the system 101.

Figure 2:
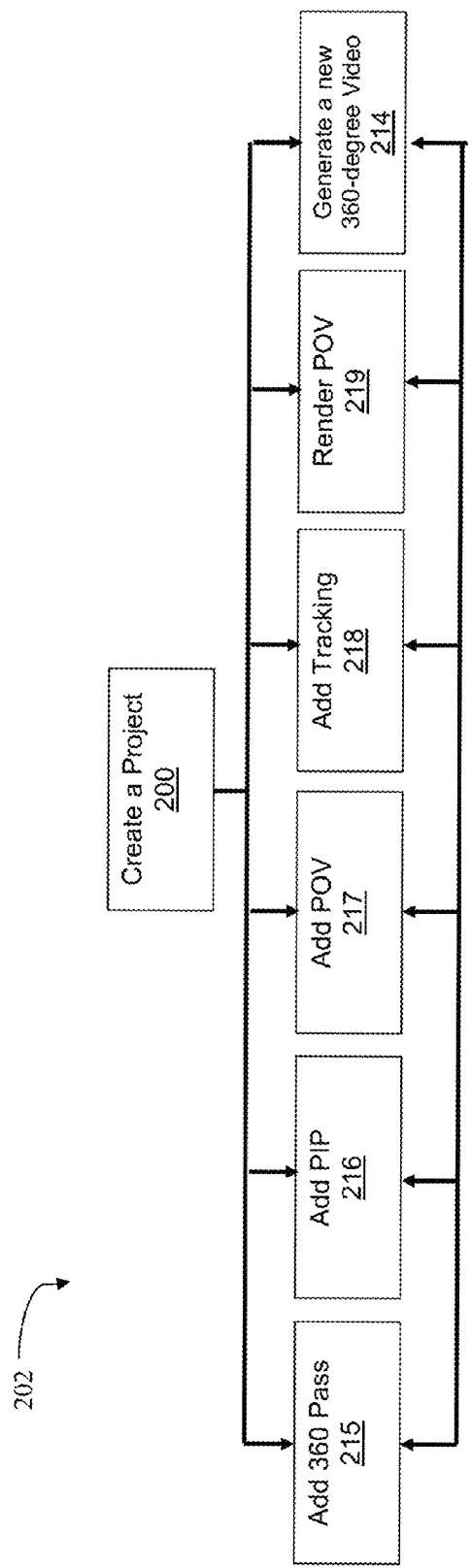
FIG. 2 shows a flow diagram illustrating an example method for 360-degree video post-production in accordance with an example embodiment.

In accordance with an example embodiment, the processor 140 operates under stored program control and executes software modules 121 stored in a computer readable medium such as persistent memory, for example, in a data storage device 142. As illustrated in FIG. 2, in accordance with an example embodiment, the software modules 121 include a 360-degree video post-production application 172 and may also include operating system software 123, and other software applications 125.

In accordance with an example embodiment, software modules 121 or parts thereof may be temporarily loaded into volatile memory such as the RAM 146 or the GPU's 141 volatile memory. The volatile memory is used for storing runtime data variables and other types of data or information, as will be apparent to those skilled in the art. The GPU's 141 volatile memory is typically used for storing software modules 121 or parts thereof, runtime data variables and other types of data or information related to graphics processing.

In accordance with an example embodiment, the system 101 stores data 127 in an erasable persistent memory, which can include one or more data storage devices 142. The data 127 can include data 127 related to the 360-degree video post-production, including parts or all of the images or videos that are being edited or being used in post-production.

Although specific functions are described for various types of memory, these are only examples, and those skilled in the art will appreciate that a different assignment of functions to types of memory could also be used.

In accordance with an example embodiment, the system 101 receives power from a power supply 136, which typically receives power from an external source such as a plug into a power grid or an internal source, such as a battery.

Having provided an overview of an example system 101 on which example embodiments may be applied, specific features of example embodiments of the 360-degree video post-production methods and systems will now be explained in greater detail.

Figure 4:
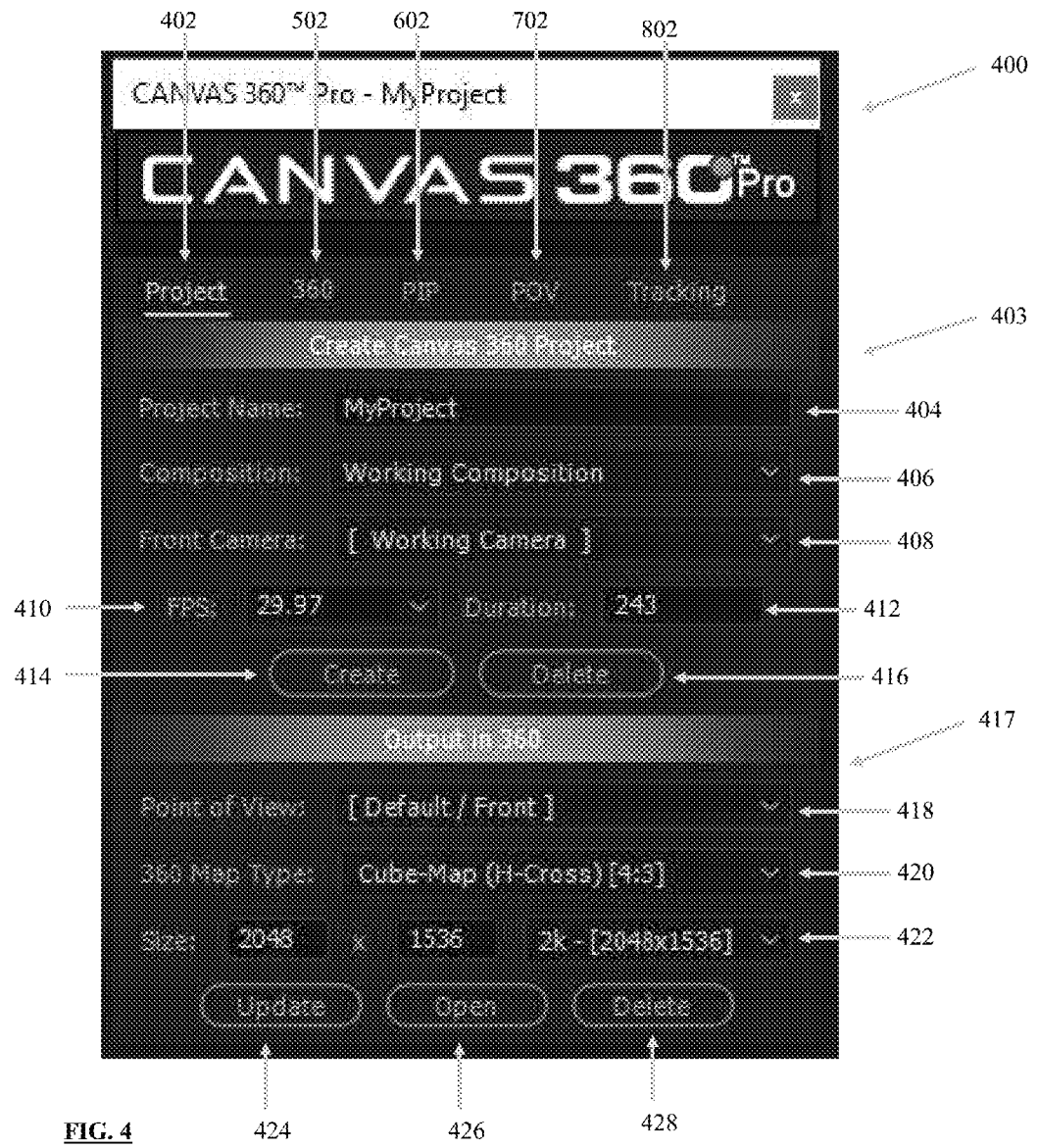
FIG. 4 is a screen shot illustrating a project tab on an example user interface screen displayed on the video post-production system of FIG. 1.
Figure 5:
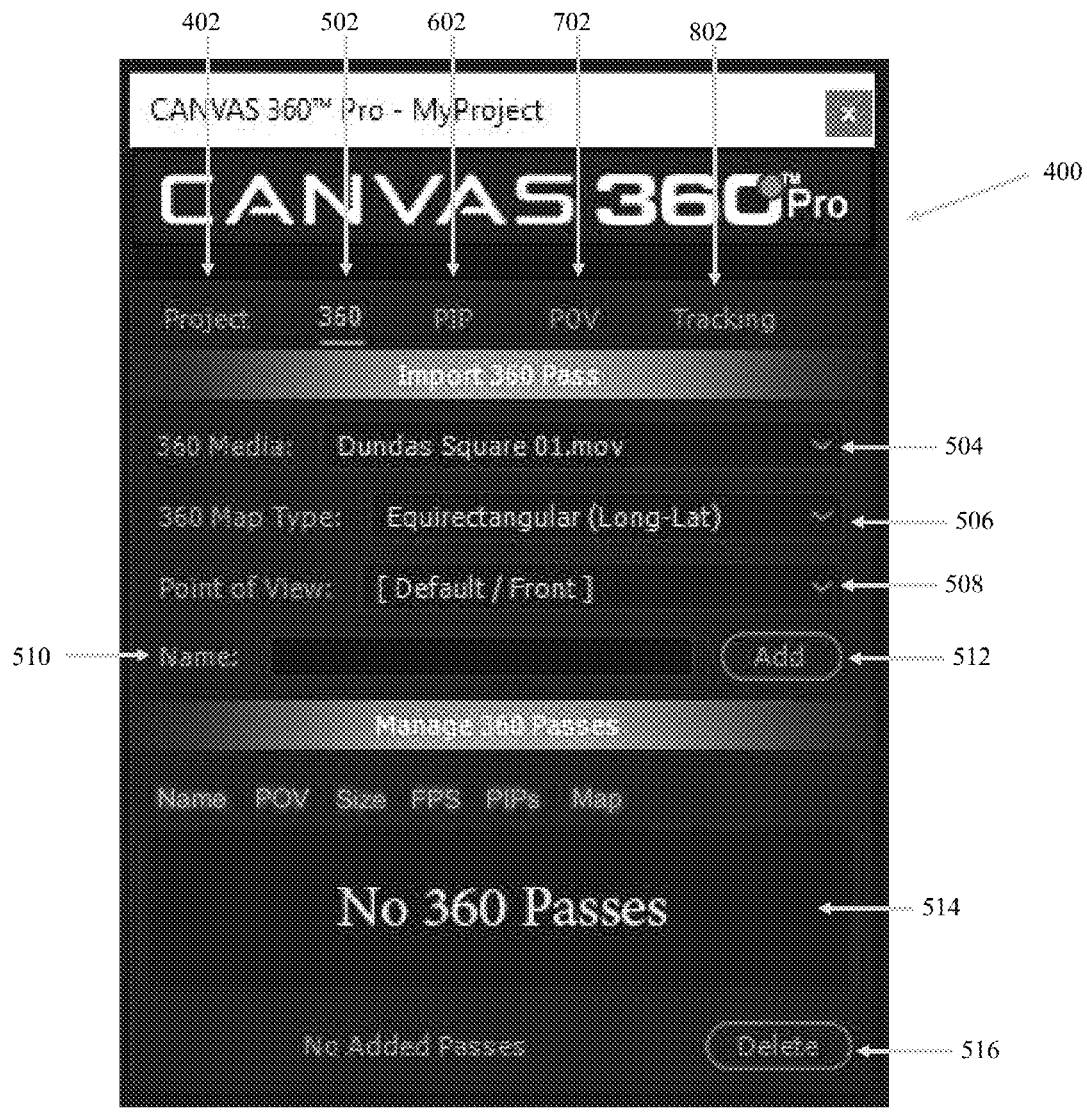
FIG. 5 is a screen shot illustrating a 360 tab on an example user interface screen displayed on the video post-production system of FIG. 1.
Figure 6:
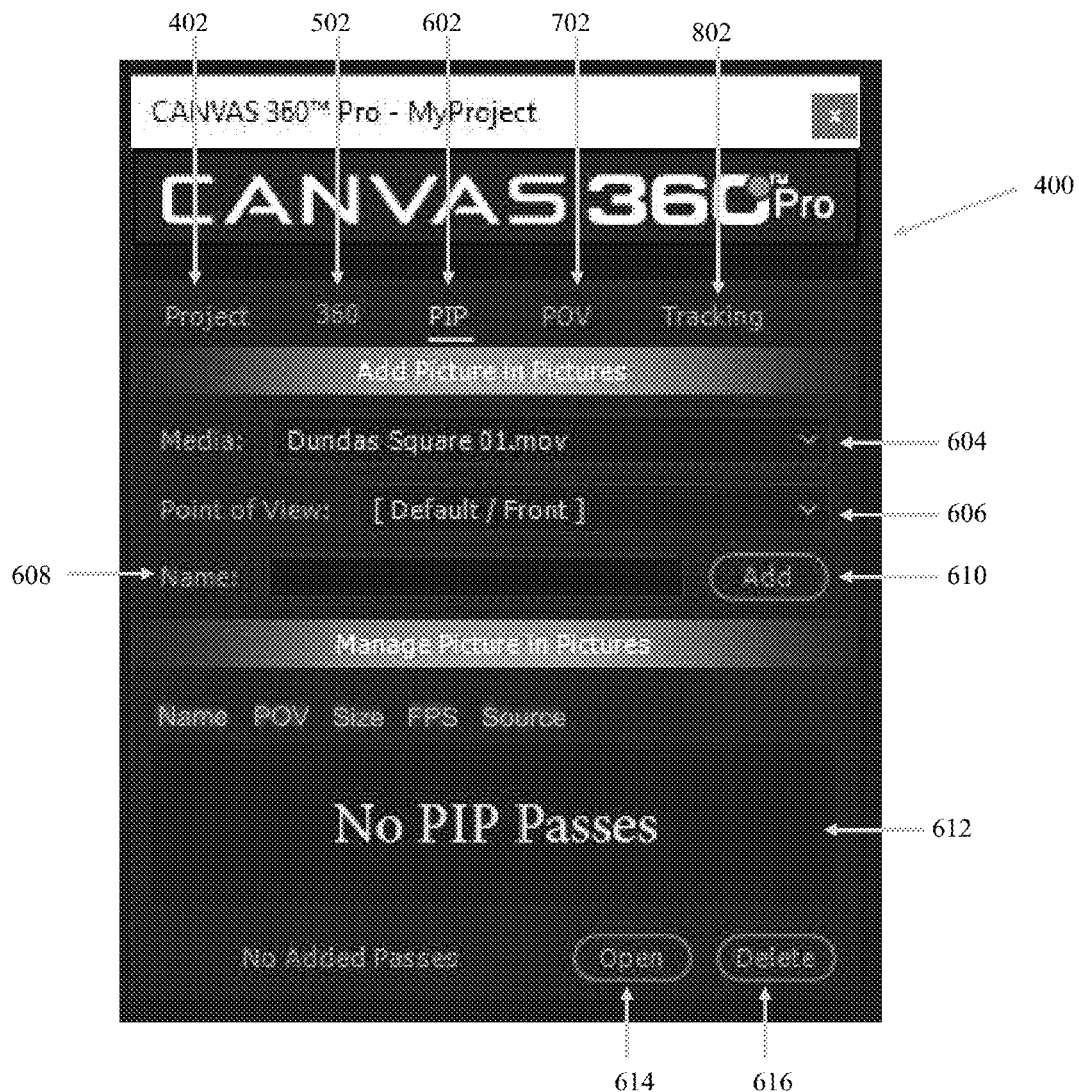
FIG. 6 is a screen shot illustrating a Picture-In-Picture (PIP) tab on an example user interface screen displayed on the video post-production system of FIG. 1.

Referring to FIG. 2, in accordance with an example embodiment a user can create a project 200 to start the 360-degree video post-production process 202. As shown in FIG. 4, in accordance with an example embodiment, the 360-degree video post-production application 172 may provide the user with a user interface 400. The user can interact with the user interface 400 using one or more of the input devices 106. In accordance with an example embodiment, the user interface 400 may include a Project tab or page 402. In accordance with an example embodiment, the Project tab or page may have a Create Canvas 360 Project section 403. In accordance with an example embodiment, the user can provide a name for the project in the project name field 404, and specify the frame rate in the FPS field 410 and the duration or length of the project in the duration field 412.

In accordance with an example embodiment, the 360-degree composition of the post-production project is saved as a cube map 1000. In accordance with an example embodiment, the 360-degree composition is saved by the 360-degree video post-production application 172 as a cube map 1000 in the project data 127 file. While an example embodiment may be described in relation to a cube map 1000, a person skilled in the art would be familiar with how images are transformed between different map types and would be familiar with the changes necessary to accommodate other map types in the example embodiments.

Furthermore, while reference is generally made to 360-degree videos in example embodiments, a person skilled in the art would understand that example embodiments can also be used for post-production of 360-degree pictures or stills. In accordance with an example embodiment, post-production can be applied to a 360-degree picture or still as if it were a single frame of a 360-degree video.

In accordance with an example embodiment, the user can create a project 200 based on an existing video composition from a video post-production tool. In accordance with an example embodiment, a composition is a framework for a movie with its own timeline. In accordance with an example embodiment, layers are elements that make up a composition, and compositions can contain as many layers as necessary. Compositions can contain as few as a single layer while others can include thousands of layers. In accordance with an example embodiment, a composition can include multiple layers that represent components such as video and audio footage items, animated text and vector graphics, still images, and lights. In accordance with an example embodiment, there are several kinds of layers, including video and audio layers that are based on footage items that you import, such as still images, movies, and audio tracks; layers that perform special functions, such as cameras, lights, adjustment layers and null objects; solid-color layers that are based on solid-color footage items; synthetic layers that hold visual elements such as shape layers and text layers; and precomposition layers which use compositions as their source footage items. In accordance with an example embodiment, a footage item can be added to a composition by creating a layer for which the footage item is the source. In accordance with an example embodiment, when you modify a layer, you do not affect its source footage item. In accordance with an example embodiment, you can use the same footage item as the source for more than one layer and use the footage differently in different layers. In accordance with an example embodiment, layers can be arranged within a composition in space and time, and composite using transparency features to determine which parts of underlying layers show through the layers stacked on top of them. In accordance with an example embodiment, the 360-degree video post-production application 172 includes video composition tools, which are known in the art, which the user can use to create a composition. In accordance with an example embodiment, the 360-degree video post-production application 172 interacts with a video composition application 125, which the user can use to create a composition.

In accordance with an example embodiment when the user creates a project 200 based on an existing composition, the user can input or select a composition in the Composition field 406 as well as input or select the front camera for the composition in the Front Camera field 408. In accordance with an example embodiment, the project name can be entered by the user into the project name field 404 or it can be automatically input by the 360-degree video post-production application 172 based on the file name for the composition. In accordance with an example embodiment, the frame rate can be automatically input into the FPS field 410 and the length of the project can be automatically input into the duration field 412 based on the frame rate and length of the composition. In accordance with an example embodiment, the project created based on an existing composition will have the same resolution as the composition.

In accordance with an example embodiment, when a user creates a project 200 based on an existing composition, 360-degree video footage created based on the composition will exist as a first video layer in the project's 360-degree composition. In accordance with an example embodiment, when the first video layer is created from the existing composition, a cube map 1000 is built out of the existing composition. Methods for creating a cube map 1000 out of an existing composition are further described below. In accordance with an example embodiment, the 360-degree video post-production application 172 uses the processor 140, the GPU 141 or a combination of the processor 140 and GPU 141 to generate the 360-degree video footage based on the composition. In accordance with an example embodiment, the 360-degree video post-production application 172 creates a new project data 127 file with a 360-degree composition with the 360-degree video footage based on the existing composition as a first video layer in the project data 127 file. In accordance with an example embodiment, the project is created when the user presses the create button 414 after selecting a composition in the Composition field 406.

In accordance with an example embodiment, when a user creates a project 200 that is not based on an existing composition, the new project includes a new blank 360-degree composition with the requested frame rate and duration and a blank cube map 1000. In accordance with an example embodiment, a user can select "New Composition" in the composition field 406 to create a new blank project. In accordance with an example embodiment, the 360-degree video post-production application 172 saves the 360-degree composition in the project data 127 file. In accordance with an example embodiment, the blank 360-degree composition is created with a default resolution. In accordance with an example embodiment, the default resolution is 1920×1080. In accordance with an example embodiment, the user can select a resolution for the new blank project. In accordance with an example embodiment, the user can change the resolution of the project after it is created. In accordance with an example embodiment, the new blank project is created when the user presses the create button 414 on a user interface 400.

In accordance with an example embodiment, a project can be deleted by pressing the Delete button 416. In accordance with an example embodiment, when a project is deleted, the 360-degree video post-production application 172 deletes the project data 127 file.

In accordance with an example embodiment, the user can add additional layers to the project's 360-degree composition throughout post-production. In accordance with an example embodiment, the data 127 relating to the project layers are saved in the project data 127 file.

In accordance with an example embodiment, when a user creates a new project 200, that project will have a default POV. The default POV can be understood as the default, front view 302 of the project. In accordance with an example embodiment, when a user creates a new project 200 based on an existing composition, the view 302 which was selected in the Front Camera field 408 will be aligned with the default POV. In accordance with an example embodiment, when a user creates a new project 200 that has a blank cube map 1000, the default POV will be the center of the scene.

In accordance with an example embodiment, the user is shown the project's 360-degree composition after the project is created. In accordance with an example embodiment, the user is shown the project's 360-degree composition from a particular orientation in the omni directional camera viewer based on the default POV. In accordance with an example embodiment, the 360-degree video post-production application 172 may show the omni directional camera viewer on one or more of the displays 104.

Figure 3:
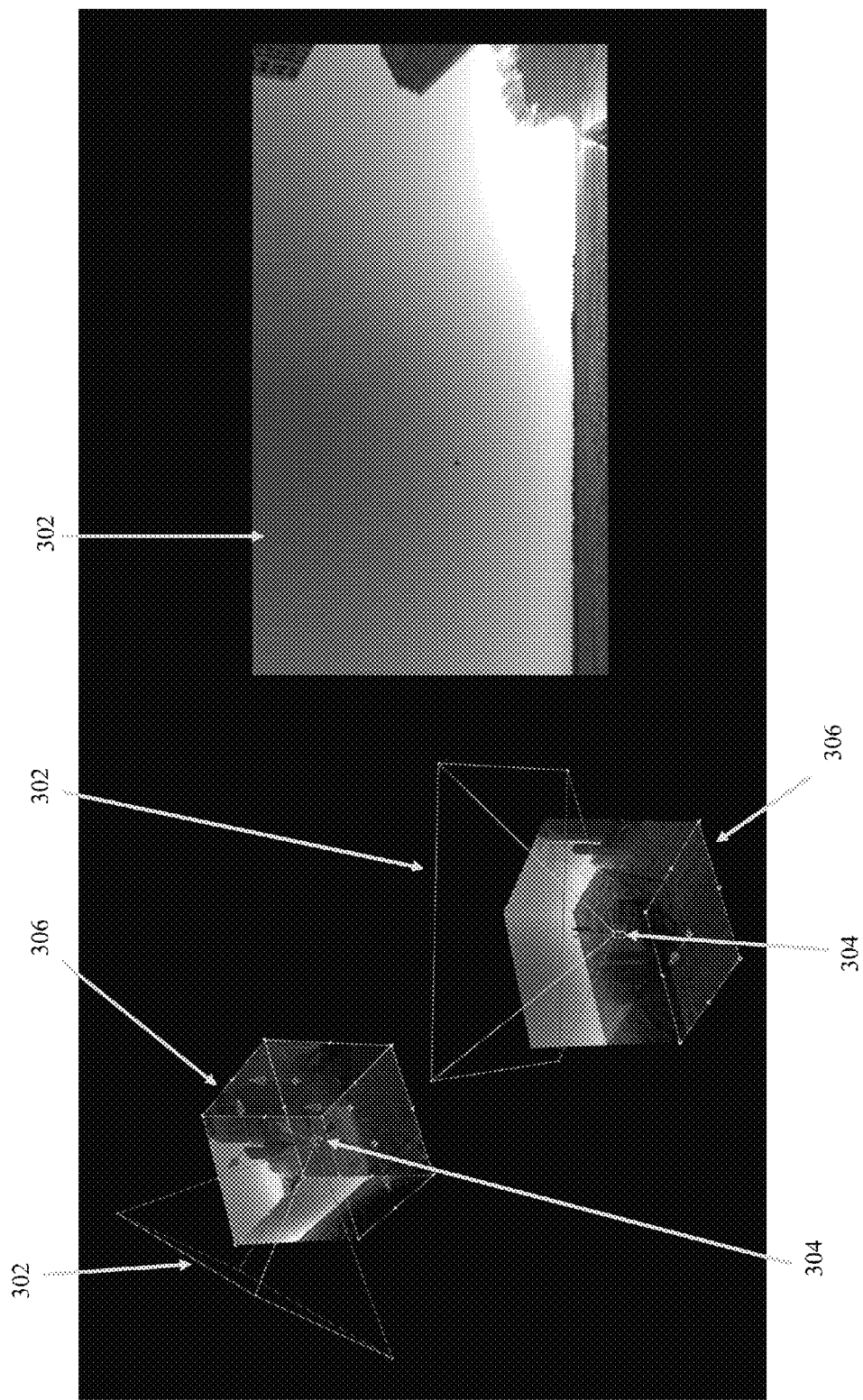
FIG. 3 is an illustration of a Point-of-View (POV) in a 360-degree video.

In accordance with an example embodiment, the omni directional camera view shows a rectilinear view 302 of the project's 360-degree composition on one or more of the displays 104 based on a frame of a particular POV. As shown in FIG. 3, a view 302 can be considered as a subset of the 360-degree composition based on a particular focal length, angle of view and orientation. Any orientation of the 360-degree sphere can be selected for a view 302, at any azimuth angle and elevation angle, for example. The angle of view, which may also be referred to as a field of view, describes the angular extent or size of the view 302. The focal length determines the extent of zoom of the view 302. In accordance with an example embodiment, a user can be considered as viewing a 360-degree scene 306 from the centre 304 of that scene 306. The particular focal length, angle of view and orientation for the frame of the POV the user has selected determines which view 302 of the 360-degree scene 306 is shown to the user.

In accordance with an example embodiment, the 360-degree video post-production application 172 uses the processor 140, the GPU 141 or a combination of the processor 140 and GPU 141 to generate a rectilinear version of the view 302 based on the layers of the 360-degree composition in the project data 127 file. In accordance with an example embodiment, the resulting rectilinear version of the view can be stored temporarily in volatile memory such as the RAM 146 or the GPU's 141 volatile memory and output to one or more of the displays 104. In accordance with an example embodiment, the 360-degree video post-production application 172 may save the resulting rectilinear version of the view in the project data 127 file.

In accordance with an example embodiment, the user can use one or more of the input devices 106 to change the omni directional camera viewer to show different frames of the POV or to change the particular focal length, angle of view, or orientation of the view 302 in order to display other parts of the 360-degree scene 306. In accordance with an example embodiment, the user can select which of the layers of the project's 360-degree composition are displayed.

Figure 11:
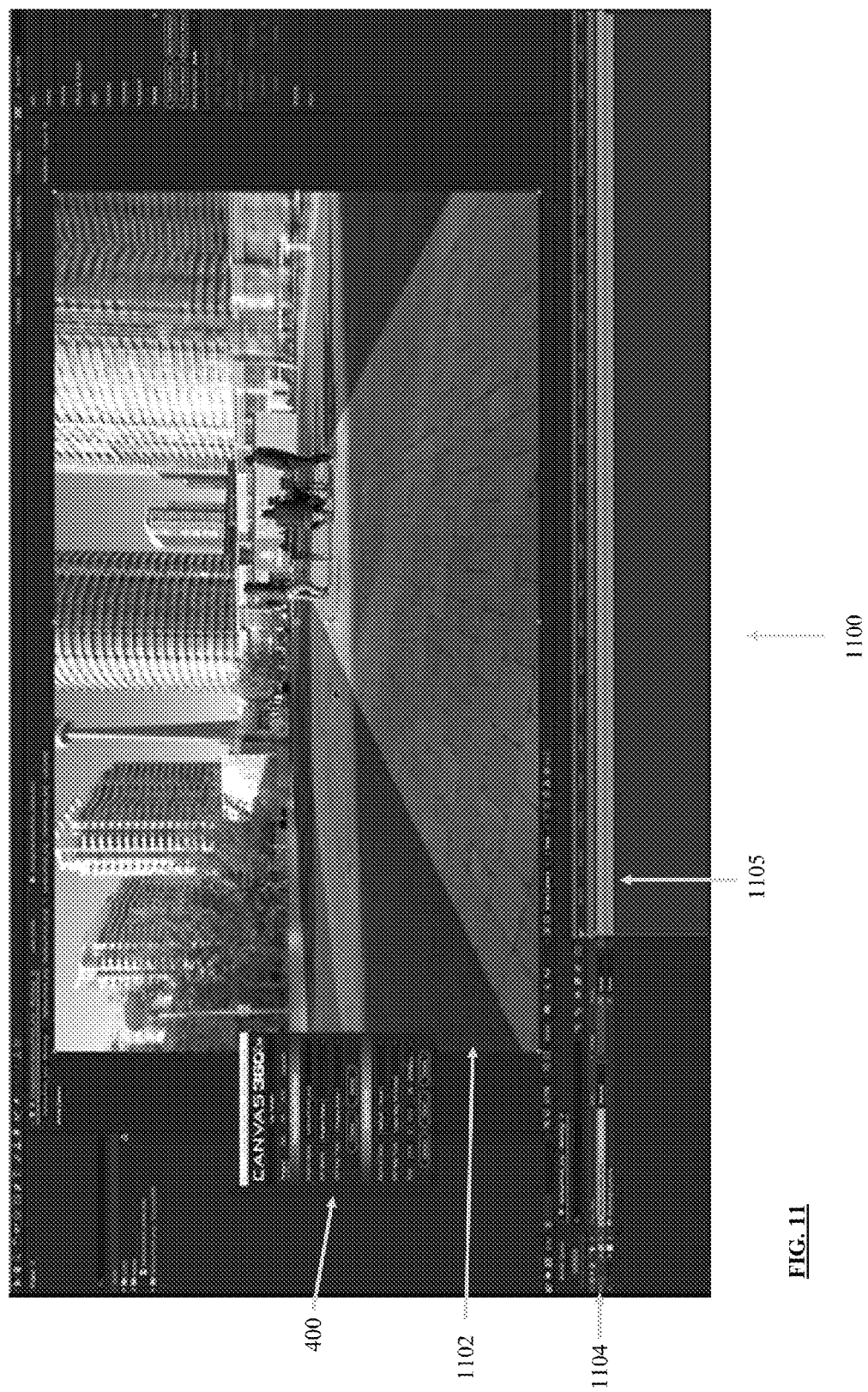
FIG. 11 is a screen shot illustrating an example omni directional camera viewer interface.

As shown in FIG. 11, in accordance with an example embodiment, the 360-degree video post-production application 172 can provide the user with an omni directional camera viewer interface 1100 on one or more of the displays 104. In accordance with an example embodiment, the omni directional camera viewer interface can include a viewing area 1102 to display a frame of the POV to the user and a list of layers 1104 in the project, which the user can use to turn layers on or off using an input device 106. In accordance with an example embodiment, the user can select which frame of the project is being shown in the viewing area 1102 by selecting a particular frame from the frame selector 1105 using an input device 106.

As shown in FIG. 2, in accordance with an example embodiment, in order to facilitate video-post production, the user can add POVs 217 to the project. By defining the particular focal length, angle of view, and orientation for each frame of the project's 360-degree composition, a POV identifies a particular view 302 of the 360 degree scene 306 for each frame of the project.

In accordance with an example embodiment, the user can create a new POV from the omni directional camera viewer by modifying and animating the omni directional camera viewer's parameters. In accordance with an example embodiment, the user can use one or more input devices 106 to adjust the viewing area 1002 of the omni directional camera viewer interface 1100 and modify the focal length, angle of view, and orientation parameters to select a view 302 of the 360-degree scene 306. In accordance with an example embodiment, the user can select a view 302 of the 360-degree scene 306 for a number of key frames from the 360-degree composition, and the focal length, angle of view, and orientation for each frame in between the key frames is interpolated. In accordance with an example embodiment, the 360-degree video post-production application 172 uses the processor 140, the GPU 141 or a combination of the processor 140 and GPU 141 to interpolate the focal length, angle of view, and orientation for each frame between the key frames. In accordance with an example embodiment, the user may select one focal length, angle of view, and orientation for the entire 360-degree composition as a POV. In accordance with an example embodiment, the user may manually enter or modify the focal length, angle of view, and orientation for the POV.

Figure 7:
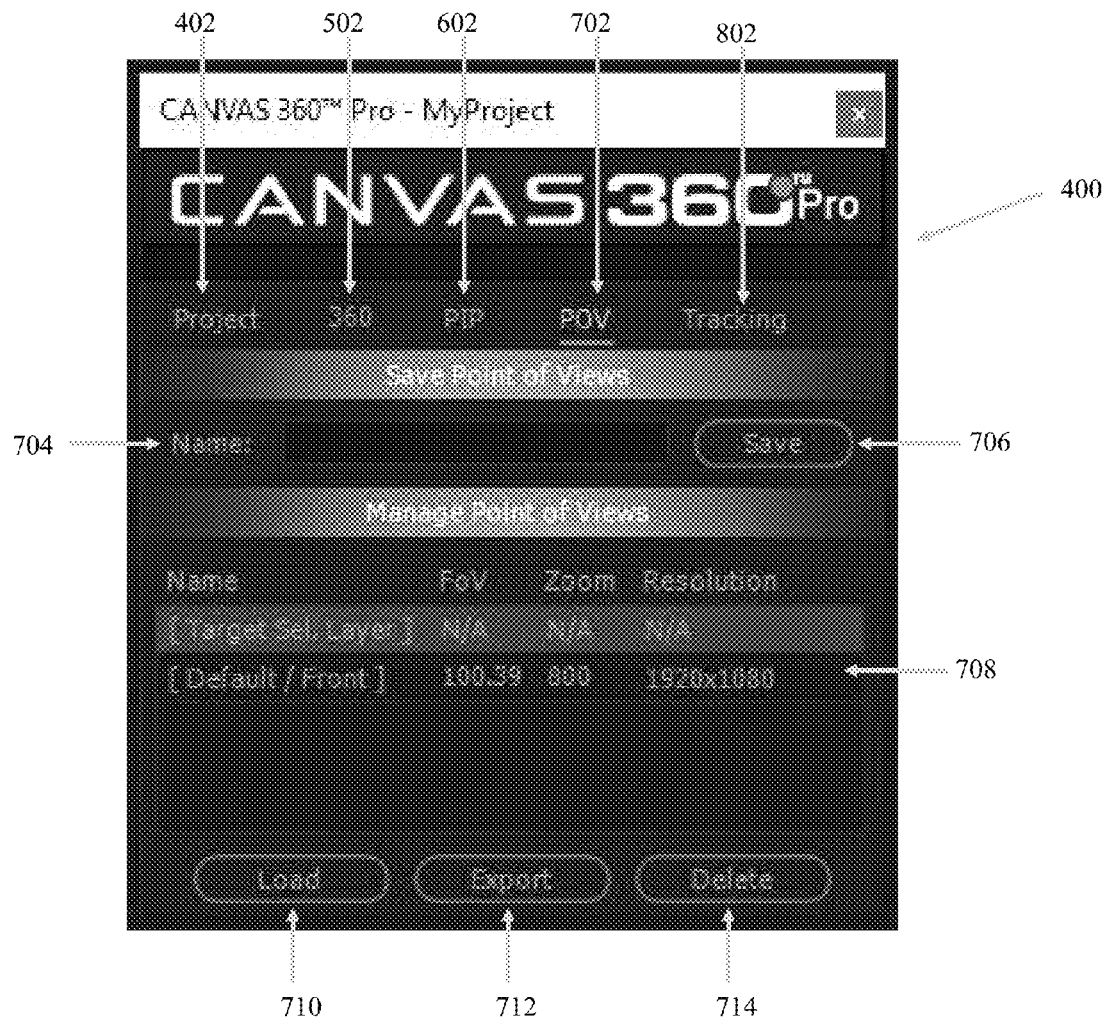
FIG. 7 is a screen shot illustrating the POV tab on an example user interface screen displayed on the video post-production system of FIG. 1.

As shown in FIG. 7, in accordance with an example embodiment, the 360-degree video post-production application 172 will provide the user with a user interface 400 which includes a POV tab or page 702. After creating a new POV, the user can enter a name for the POV into the Name field 704 and add a POV 217 to the project by using the save button 706. In accordance with an example embodiment, when a user adds a POV 217 to the project, the 360-degree video post-production application 172 can save the information for the POV in the project data 127 file.

In accordance with an example embodiment, the user interface 400 may provide the user with a list of the POVs 708. The user can select a POV from the list of POVs 708. In accordance with an example embodiment, the user can select a specific POV from the list of POVs 708. In accordance with an example embodiment, the user can open a specific POV by double clicking on the POV or pressing the load button 710. In accordance with an example embodiment, the POV can be viewed using the omni directional camera viewer. In accordance with an example embodiment, when a POV is opened, the focal length, angle of view, and orientation for the omni directional camera viewer are matched to the focal length, angle of view, and orientation of the opened POV, and the user is shown a particular frame of the opened POV. In accordance with an example embodiment, the frame of the POV shown to the user in the omni directional camera viewer may be the first frame, or it may be the frame of the 360-degree composition that was being viewed by the user immediately before opening the POV. In accordance with an example embodiment, the omni directional camera viewer allows the user to look around the 360-degree composition after loading the POV. In accordance with an example embodiment, the POV is shown in the omni directional camera viewer interface 1100.

In accordance with an example embodiment, the 360-degree video post-production application 172 can export a POV to the system's 101 data storage devices 142, an external hard drive connected through the I/O subsystem 150 or serial port 152, other persistent memory connected to the system 101, or an external communication link or interface. In accordance with an example embodiment, the selected POV can be exported using the export button 712 and then providing the 360-degree video post-production application 172 with an export location for the POV information. In accordance with an example embodiment, the POV information includes the parameters for the POV.

In accordance with an example embodiment, exporting may be helpful when a 360-degree video is being edited in different instances of the video post-production application 172 or when different project data 127 files are used with respect to the same 360-degree video. In accordance with an example embodiment, a POV may also be exported in order to save a copy for later use.

In accordance with an example embodiment, a POV can be deleted from the project. In accordance with an example embodiment, a POV can be deleted by selecting the POV from the list of POVs 708 and then using the delete button 714. In accordance with an example embodiment, when a POV is deleted, the 360-degree video post-production application 172 deletes the information related to that POV from the project data 127 file.

In accordance with an example embodiment, a user can render a POV 219 in order to create a rectilinear video based on the POV. In accordance with an example embodiment, to render a rectilinear video based on the POV, the 360-degree video post-production application 172 creates a rendered video where each frame of the rendered video is the rendered view 302 of the corresponding frame of the 360-degree composition of the project, as defined by the POV. In accordance with an example embodiment, the layers for the frame of the 360-degree composition are flattened into a single layer when rendering the 360-degree scene.

In accordance with an example embodiment, a user can render a POV 219 by opening the POV, and then selecting a render POV option (not shown) in the unified omni directional camera viewer interface 1100. In accordance with an example embodiment, the 360-degree video post-production application 172 can save the rendered video in the project data 127 file. In accordance with an example embodiment, the 360-degree video post-production application 172 can save the rendered video as a separate file in the system's 101 data storage devices 142, on an external hard drive connected through the I/O subsystem 150 or serial port 152, in a camera's 160 internal memory, in other persistent memory connected to the system 101, or the rendered video may be sent through an external communication link or interface.

As shown in FIG. 2, in accordance with an example embodiment, the user can add a 360 pass 215 into the project. In accordance with an example embodiment, a 360 pass can include video or still image files from a 360-degree camera, computer generated 360-degree footage or images, and/or 360-degree videos or images created by stitching together footage from a number of cameras.

Examples of video files include but are not limited to Animated GIF (GIF); DV (in MOV or AVI container, or as containerless DV stream); ElectricImage (IMG, EI); Filmstrip (FLM); Flash (SWF); MPEG formats (MPEG, MPE, MPG, M2V, MPA, MP2, M2A, MPV, M2P, M2T, VOB, MOD, AC3, MP4, M4V, M4A); Open Media Framework (OMF); QuickTime™ (MOV); Adobe™ Photoshop™ with video layer (PSD); Video for Windows™ (AVI, WAV); and Windows™ Media File (WMV, WMA, ASF). Examples of images files include but are not limited to Adobe™ Illustrator™ (AI, AI4, AI5, EPS, PS); Adobe™ PDF (PDF); Adobe™ Photoshop™ (PSD); Bitmap (BMP, RLE, DIB); Camera raw (TIF, CRW, NEF, RAF, ORF, MRW, DCR, MOS, RAW, PEF, SRF, DNG, X3F, CR2, ERF); Cineon™ (CIN, DPX); Discreet™ RLA/RPF (RLA, RPF); EPS; JPEG (JPG, JPE); Maya™ camera data (MA); Maya™ IFF (IFF, TDI; 16 bpc); OpenEXR (EXR; 32 bpc); PBM (8, 16, and 32 bpc); PCX; PICT (PCT); Pixar™ (PXR); Portable Network Graphics (PNG); Radiance™ (HDR, RGBE, XYZE); SGI (SGI, BW, RGB); Softimage™ (PIC); Targa™ (TGA, VDA, ICB, VST); TIFF (TIF). 360-degree video files can be saved using different map types, including equirectangular map 900 or cube map 1000.

As shown in FIG. 4, in accordance with an example embodiment, the 360-degree video post-production application 172 provides the user with a user interface 400 which includes a 360 tab or page 502. In accordance with an example embodiment, the user can input or select the file containing the 360 media that the user wants to add to the project in the 360 Media field 504. In accordance with an example embodiment, the file containing the 360 media may have been saved on the system's 101 data storage devices 142, on an external hard drive connected through the I/O subsystem 150 or serial port 152, in a camera's 160 internal memory, in other persistent memory connected to the system 101, or the file may come from an external communication link or interface.

In accordance with an example embodiment, the user identifies the map type of the 360 pass in the 360 Map Type field 506. In accordance with an example embodiment, the map type is identified automatically from the file containing the 360 media.

In accordance with an example embodiment, the user can add a name to identify the particular pass in the Name field 510.

In accordance with an example embodiment, when the user directs the 360-degree video post-production application 172 to add the 360 pass 215, for example by pressing the Add button 512, the 360-degree video post-production application 172 begins importing the 360-degree pass into the project data 127 file.

In accordance with an example embodiment, a cube map 1000 is built out of the 360 media. In accordance with an example embodiment, the cube map's 1000 orientation and rotation is set so that the front face of the 360 media is aligned with the default POV. In accordance with an example embodiment, the cube map's 1000 orientation and rotation is set so that the front face of the 360 media is aligned with a project POV selected by the user. In accordance with an example embodiment, the user selects the project POV that will be used using the Point of View field 508. In accordance with an example embodiment, the methods for creating a cube map 1000 out of a 360-degree composition, further described below, are used to build a cube map 1000 out of the 360 media.

In accordance with an example embodiment, the cube map 1000 is added as a new video layer in the project's 360-degree composition. In accordance with an example embodiment, where there are existing layers in the project, the new 360 pass layer can be placed above, in between, or under any of the existing layers in the project. In accordance with an example embodiment, the new layer is saved in the project data 127 file.

In accordance with an example embodiment, the 360 media for the 360 pass has the same duration and length as the 360-degree composition of the project. In accordance with an example embodiment, if the frame rate of the 360 media does not match the project frame rate, the user will receive a confirmation window asking the user whether the user wants to continue with the incorrect frame rate or cancel the operation.

In accordance with an example embodiment, an imported 360 pass which does not have the same duration as the 360-degree composition will be modified to match the 360-degree composition's duration. In accordance with an example embodiment, where the 360 pass is longer than the 360-degree composition, the 360 pass is edited to remove part of the beginning, part of the end, or part of the beginning and part of the end of the 360 pass. In accordance with an example embodiment, where the 360 pass is longer than the 360-degree composition, the 360-degree composition is extended at the beginning, the end, or the beginning and end of the 360-degree composition in order to lengthen the duration of the 360-degree composition, the extension consisting of either blank footage or a still based on the first or last frame of the 360-degree composition. In accordance with an example embodiment, where the 360 pass is shorter than the 360-degree composition, the 360 pass is extended at the beginning, the, end or the beginning and end of the pass in order to lengthen the duration of the 360 pass, the extension consisting of either blank footage or a still based on the first or last frame of the 360 pass. In accordance with an example embodiment, where the 360 pass is shorter than the 360-degree composition, the 360-degree composition is edited to remove part of the beginning, part of the end, or part of the beginning and part of the end of the 360-degree composition in order to shorten the duration of the 360-degree composition. In accordance with an example embodiment, the system 101 uses the processor 140, the GPU 141 or a combination of the processor 140 and GPU 141, to edit the length of the 360 pass or 360-degree composition.

In accordance with an example embodiment, adding a 360 pass 215 may be part of the process to create a project 200. In accordance with an example embodiment, the user selects a 360 pass to import as part of the process to create a new project 200. In accordance with an example embodiment, the frame rate and duration for the project may be automatically detected based on information from the 360 pass file. In accordance with an example embodiment, the new project is created with the 360 pass as the first video layer of the project's 360-degree composition. In accordance with an example embodiment, the 360-degree video post-production application 172 creates a new project data 127 file, which includes a first video layer with the 360 pass. In accordance with an example embodiment, the front camera view 302 of the 360 pass which was added when creating the new project 200 will be aligned with the default POV of the project.

As shown in FIG. 2, in accordance with an example embodiment, the user can apply post-production editing by adding a picture-in-picture (PIP) 216 to a particular POV. In accordance with an example embodiment, adding a PIP 216 allows the user to make edits in a particular POV, for example, color corrections, addition of computer generated images, or composition of rectilinear videos into the POV. In accordance with an example embodiment, the edits made in that POV are added as a new PIP layer in the 360-degree composition of the project. In accordance with an example embodiment, the layers are saved as part of the project data 127 file.

In accordance with an example embodiment, PIP editing can be performed directly in the omni directional camera viewer in a method referred to as solid PIP. In solid PIP, a new PIP layer is added to the 360-degree composition of the project at the position of the particular POV. In accordance with an example embodiment, the new solid PIP layer is added as the top layer of the 360-degree composition. In accordance with an example embodiment, the solid PIP layer is a solid layer comprised of a single solid color. In accordance with an example embodiment, the solid PIP layer is an adjustment layer, which is a flat transparent layer that can be used to add adjustments to any layers underneath the adjustment layer.

In accordance with an example embodiment, the PIP editing can be performed on a sub-composition of the project from the selected POV. In this method, referred to as 360 PIP, a sub-composition of the project is created by flattening the 360-degree composition's layers from the selected POV into a single layer.

In accordance with an example embodiment, the sub-composition is saved in the project data 127 file. In accordance with an example embodiment, rectilinear post-production visual effects methods and tools can be applied to the sub-composition since the selected POV defines a rectilinear portion of the 360-degree composition.

In accordance with an example embodiment, the 360-degree video post-production application 172 includes rectilinear post-production visual effects methods and tools that the user can use to apply visual effects to the sub-composition. In accordance with an example embodiment, the 360-degree video post-production application 172 may interact with a rectilinear post-production application 125 by providing it with the sub-composition. Rectilinear post-production methods can then be applied to the sub-composition using the rectilinear post-production application 125. Edits to the sub-composition are communicated back to the 360-degree video post-production application 172.

In accordance with an example embodiment, by overlaying the sub-composition layer with the same focal length, angle of view and orientation as the POV associated with the 360 PIP, the sub-composition is integrated into the 360-degree composition of the project.

In accordance with an example embodiment rectilinear media files, which could be video or image files, can be overlaid over a POV in the 360-degree video in a method referred to as media PIP. In accordance with an example embodiment, the media file of the media PIP is aligned with the same focal length, angle of view and orientation as the POV in order to overlay the POV with the associated media file.

In accordance with an example embodiment, the imported media file for a media PIP may be a video file rendered from a POV in the project. In accordance with an example embodiment, the rendered media file can be edited using different video post-production applications 125 in the system 101 or exported to and edited in a different video post-production system. In accordance with an example embodiment, the user would typically use the same POV from which the media file was rendered when importing the rendered media file back into the project using Media PIP.

In accordance with an example embodiment, the media file contains a video that has the same duration and length as the 360-degree composition of the project. In accordance with an example embodiment, the media file contains an image, in which case a duplicate of that image is created for each frame of the 360-degree composition. In accordance with an example embodiment, an imported media file that contains a video which does not have the same duration of the 360-degree composition will be modified to match the 360-degree composition's duration. In accordance with an example embodiment, where the video in the media file is longer than the 360-degree composition, the video in the media file is edited to remove part of the beginning, part of the end, or part of the beginning and part of the end of the video in the media file. In accordance with an example embodiment, where the video in the media file is longer than the 360-degree composition, the 360-degree composition is extended at the beginning, the end, or the beginning and end of the 360-degree composition in order to lengthen the duration of the 360-degree composition, the extension consisting of either blank footage or a still based on the first or last frame of the 360-degree composition. In accordance with an example embodiment, where the video in the media file is shorter than the 360-degree composition, the video in the media file is extended at the beginning, the, end or the beginning and end of the pass in order to lengthen the duration of the video in the media file, the extension consisting of either blank footage or a still based on the first or last frame of the video in the media file. In accordance with an example embodiment, where the video in the media file is shorter than the 360-degree composition, the 360-degree composition is edited to remove part of the beginning, part of the end, or part of the beginning and part of the end of the 360-degree composition in order to shorten the duration of the 360-degree composition. In accordance with an example embodiment, the system 101 uses the processor 140, the GPU 141 or a combination of the processor 140 and GPU 141, to edit the length of the video in the media file or the length of the 360-degree composition.

As shown in FIG. 4, in accordance with an example embodiment, the 360-degree video post-production application 172 will provide the user with a user interface 400 which includes a PIP tab or page 602. In accordance with an example embodiment, the user can select a video file to import using Media PIP in the Media field 604. In accordance with an example embodiment, the user can select 360 PIP in the Media Field 604 if the user wants to perform 360 PIP editing. In accordance with an example embodiment, the user can select Solid PIP from the Media Field 604 if the user wants to perform Solid PIP editing. In accordance with an example embodiment, the user can select the POV to which the PIP editing will be applied in the Point of View field 606. In accordance with an example embodiment, the user can provide a name to identify the PIP edit in the Name field 608. In accordance with an example embodiment, a user can add a PIP 216 to the project by pressing the Add button 610, which creates a new PIP layer for the project based on the selected PIP editing type, as has been described. In accordance with an example embodiment, the 360-degree video post-production application 172 creates the new PIP layer and saves it in the project data 127 file.

In accordance with an example embodiment, the PIP tab or page 602 includes a list of PIP layers 612. In accordance with an example embodiment, a user can select a PIP layer from the list of PIP layers 612 and press the delete button 616 to delete the PIP layer. In accordance with an example embodiment, when a PIP layer is deleted, the 360-degree video post-production application 172 deletes information related to the PIP layer from the project data 127 file.

In accordance with an example embodiment, when a user wants to make further edits to a PIP, the user can select a PIP layer from the list of PIP layers 612 and press the open button 614 to open the PIP for further editing. In accordance with an example embodiment, the corresponding PIP layer is shown in the omni directional camera viewer for editing. In accordance with an example embodiment, when a PIP is opened, a card for the selected PIP is created. In accordance with an example embodiment, when a PIP has a card saved in the project data 127 file, that card is used when the PIP is opened. In accordance with an example embodiment, this card can then be edited in the same manner as described for 360 PIP.

Figure 13:
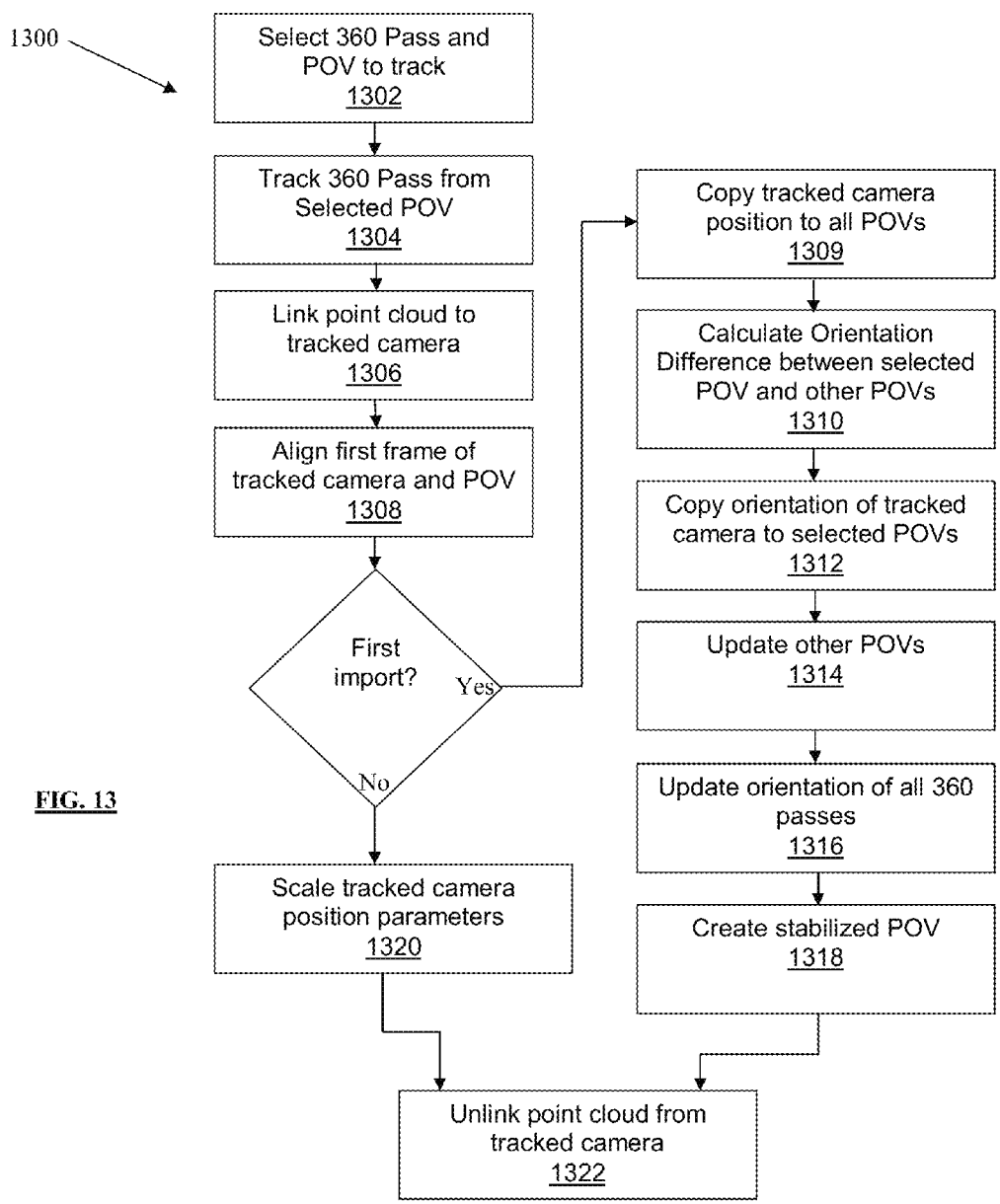
FIG. 13 is a flow diagram of a method for importing tracking information into a 360-degree video post-production project, in accordance with an example embodiment.

As seen in FIG. 2, in accordance with an example embodiment, a user can add tracking 218 information as a new layer or layers in the project. Referring to FIG. 13, an add tracking 218 method flowchart 1300 in accordance with an example embodiment is shown. In accordance with an example embodiment, a user applies tracking to a particular POV. In accordance with an example embodiment, a user can use that tracking information to assist in PIP editing, where it is desired to add visual effects that follow or are affected by a tracked object. In accordance with an example embodiment, the tracking information for a particular POV can be transformed into tracking information for the 360-degree video of the project. In accordance with an example embodiment, tracking information can be used to solve the camera for a particular POV, as is known by the person skilled in the art. In accordance with an example embodiment, a solved camera for a particular POV can be used to solve the camera for the 360-degree video of the project.

Figure 8:
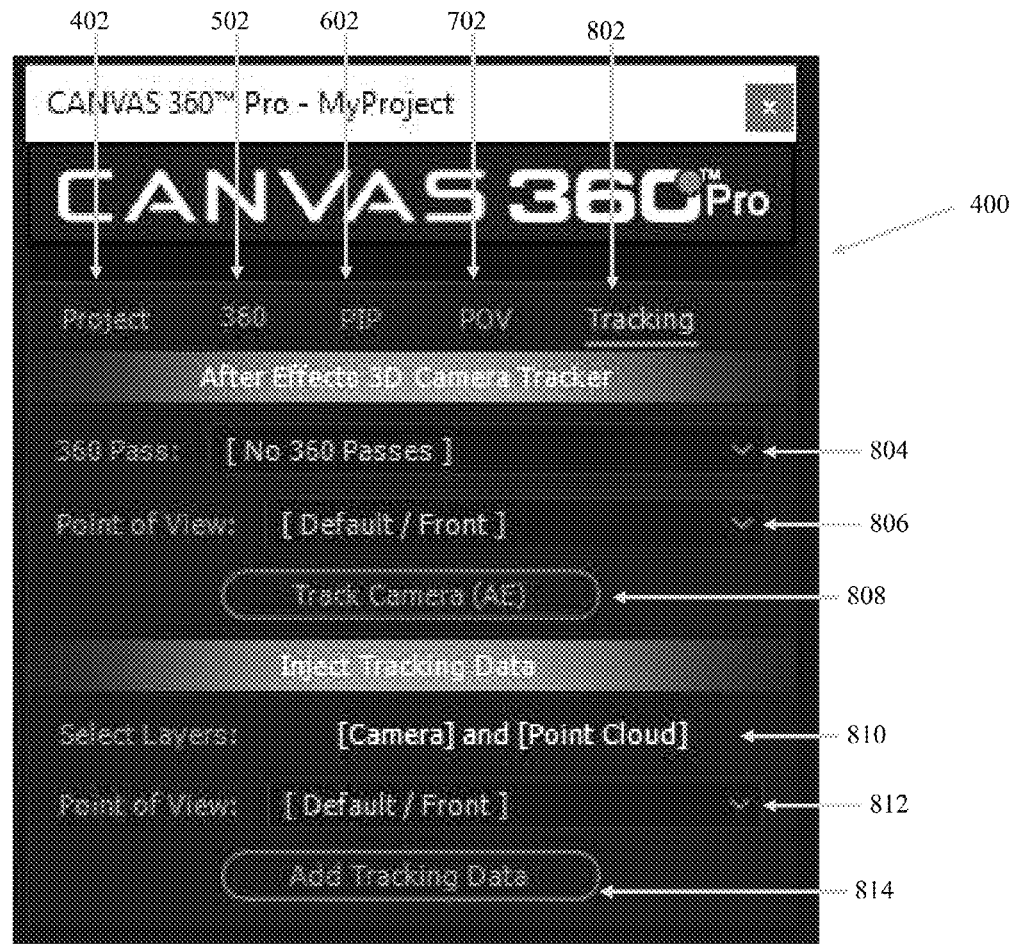
FIG. 8 is a screen shot illustrating a tracking tab on an example user interface screen displayed on the video post-production system of FIG. 1.

As shown in FIG. 8, in accordance with an example embodiment, the 360-degree video post-production application 172 will provide the user with a user interface 400 which includes a Tracking tab or page 802. In accordance with an example embodiment, the user can select the 360 pass in the 360 Pass field 804 and the POV in the Point of View field 806 on which the tracking will be performed 1302. The selected 360 pass determines which 360 pass is used as the source for the 360-degree scene 306 when generating the POV's view 302.

In accordance with an example embodiment, the 360-degree video post-production application 172 tracks the 360 pass from the selected POV 1304. In accordance with an example embodiment, the 360-degree video post-production application 172 tracks the 360 pass from the selected POV 1304 when the user presses the Track Camera button 808. In accordance with an example embodiment, by applying tracking to a particular POV, rectilinear video tracking methods, tools and algorithms can be used. In accordance with an example embodiment, tracking is performed by the 360-degree video post-production application 172 by applying rectilinear tracking algorithms using the processor 140, the GPU 141 or a combination of the processor 140 and GPU 141. In accordance with an example embodiment, the 360-degree video post-production application 172 interacts with a video tracking application 125 which generates tracking data for the POV. In accordance with an example embodiment, the tracking data for the POV is saved to the project data 127 file.

In accordance with an example embodiment, tracking is performed by existing video tracking applications 125 or video tracking systems on a video file rendered from a POV in the project. In accordance with an example embodiment, tracking information is recorded when a video is recorded or generated. In accordance with an example embodiment, tracking information generated in other tracking applications 125, in other video tracking systems, or when a video is recorded can be imported as tracking information for a particular POV of the project.

In accordance with an example embodiment, the tracking information consists of point cloud layers and a tracked camera layer, which is a virtual camera whose parameters are calculated by solving the camera for the tracked POV. In accordance with an example embodiment, the virtual camera parameters are position, focal length, angle of view and orientation. In accordance with an example embodiment, the point cloud consists of a series of layers that hold a 3D position relative to the camera.

In accordance with an example embodiment, the video post-production application 172 will display the POV along with track points from the point cloud on one or more of the displays 104 and the user will be able to edit or change the track points using one or more of the input devices 106.

In accordance with an example embodiment, the user can select one or more layers from the point cloud along with the tracked camera layer from a tracked POV to be imported into the project's 360-degree composition. In accordance with an example embodiment, all layers from the point cloud along with the tracked camera layer from a tracked POV are imported into the project's 360-degree composition.

In accordance with an example embodiment, the point cloud layers are linked to the tracked camera layer 1306 before the tracking information is imported into the project's 360-degree composition as a new layer. When point cloud layers are linked to a tracked camera layer 1306, any subsequent changes made to the camera's position or orientation, including any scaling of the camera's position, are also applied to the point cloud, meaning the relative position of the point cloud with respect to the tracked camera remains consistent when the point cloud is linked to the tracked camera.

In accordance with an example embodiment, when the tracking information is imported into the project's 360-degree composition as new layers, the tracked camera's first frame is aligned with the first frame of the tracked POV 1308 in the project's 360-degree composition. In accordance with an example embodiment, since the point cloud layers are linked to the tracked camera layer, aligning the first frame of the tracked camera with the first frame of the tracked POV 1308 also aligns the point cloud in the project's 360-degree composition.

In accordance with an example embodiment, the tracked camera layer is automatically used to stabilize the project's 360-degree composition when tracking information is first imported into the project's 360 degree composition.

In accordance with an example embodiment, if it is the first time tracking information is being imported into the project's 360-degree composition, the position of the tracked camera is copied to all other existing POVs in the project 1309, since they are all based on footage from the same camera.

In accordance with an example embodiment, if it is the first time tracking information is being imported into the project's 360-degree composition, the orientation of all the existing POVs are updated based on where each POV is facing relative to the tracked POV. In accordance with an example embodiment, the orientation differences between the tracked POV and the other POVs are calculated 1310. In accordance with an example embodiment, after the orientation differences are calculated 1310 and the tracked camera layer is aligned with the first frame of the tracked POV 1308, the orientation information from the now aligned tracked camera is copied over to the tracked POV 1312. In accordance with an example embodiment, the orientations of the other POVs are updated by adding the difference calculated to the orientation information of the now aligned tracked camera 1314. For example, if a POV is facing the exact opposite direction of the tracked POV, then its orientation will be the reverse of the tracked POV.

In accordance with an example embodiment, the orientation of the cube map 1000 of all existing 360 passes in the 360-degree composition is then aligned with the inversion of the orientation of the POV associated with the 360 pass 1316. By aligning the orientation of the cube maps 1000 with the inversion of the orientation of their associated POV 1316, the movement of the image in the 360 media is canceled out. Since the orientation of all existing POVs were updated based on the tracked camera, the POVs will still display the same view of the 360 composition after the 360-degree composition is stabilized. In accordance with an example embodiment, a new stabilized POV with all orientation values set to zero is created 1318.

In accordance with an example embodiment, when subsequent tracking information is imported into the 360-degree composition, after the tracked layer is aligned with the first frame of the tracked POV, the camera's position parameters are scaled down or up to approximately match the scale of the originally added tracking information 1320. In accordance with an example embodiment, the scale used is estimated or approximated and therefore needs to be scaled so that distances match the original tracking information. In accordance with an example embodiment, the furthest point from the first camera position is identified, and the camera path of the newly imported tracked camera layer is then scaled until the difference between the first camera position and the furthest camera position of the newly imported tracked camera layer matches the difference in the original tracking camera positions. Once the scene is scaled, the camera paths should approximately align if the tracking data is accurate since they are based on the same camera footage. By aligning the camera paths, the newly added point clouds, which are linked to the tracked camera and therefore scaled along with the tracked camera, should approximately line up in the 360-degree composition with the tracked POV, the 360 passes and other point clouds in the 360-degree composition.

In accordance with an example embodiment, the point cloud layers are unlinked from the tracked camera layer 1322 after the tracking information is imported into the project's 360-degree composition.

In accordance with an example embodiment, the 360-degree video post-production application 172 uses the processor 140, the GPU 141 or a combination of the processor 140 and GPU 141 to import the POV's tracking information into the project's 360-degree composition In accordance with an example embodiment, the tracking information is saved to the project data 127 file.

As shown in FIG. 8, in accordance with an example embodiment, the Tracking tab or page 802 includes a Select Layers field 810 to select the tracking layers and tracked camera layer to import. In accordance with an example embodiment, the user can select the POV which the tracking layers and tracked camera layer relate to in the Point of View field 812. In accordance with an example embodiment, the tracking information from the tracking layers and tracked camera layer is transformed into tracking information for the 360-degree composition when the user presses the Add Tracking Data button 814.

In accordance with an example embodiment, once tracking information for the 360-degree composition of the project is imported, the tracking information can be used in the same manner that traditional rectilinear tracking data is used. In accordance with an example embodiment, the tracking information is available in POVs in which the point cloud is visible. In accordance with an example embodiment, the point cloud data remains accurate as the user looks around the 360-degree composition from different views.

As shown in FIG. 2, in accordance with an example embodiment, a user can generate a new 360-degree video 214 from the project. In accordance with an example embodiment, the front of the newly generated 360-degree video can be aligned with any POV in the project. In accordance with an example embodiment, the newly generated 360-degree video can be generated using different map types, for example an equirectangular map 900 or a cube map 1000. In accordance with an example embodiment, the new generated 360-degree video can be generated using different resolutions, for example 8000×4000, 4000×2000, or 2000×1000 for equirectangular map-types; 8000×6000, 4000×3000, 2000×1500 for an H-cross cube map; or 6000×8000, 3000×4000, 1500×2000 for a V-cross cube map.

As shown in FIG. 4, in accordance with an example embodiment, the Project tab or page 402 may include an Output in 360 section 417. In accordance with an example embodiment, the user can select the POV to be used as the front camera for the newly generated 360-degree video from the Point of View field 418; select the map type to be used in the newly generated 360-degree video in the 360 Map Type field 420; and select the resolution for the newly generated 360-degree video in the Size field 422. In accordance with an example embodiment, the user can press the Update button 424 to generate the newly 360-degree video 214 using the selected POV, map type and resolution. In accordance with an example embodiment, the user can press the Open button 426 to open an existing 360-degree video after it has been closed by the user. In accordance with an example embodiment, the user can press the Delete button 428 to delete a 360-degree video. In accordance with an example embodiment, deleting a 360-degree video can be useful to reduce the size of the project data 127 file if the 360-degree video is saved in the project data 127 file.

In accordance with an example embodiment, when a user decides to generate a new 360-degree video 214 from the project, a new cube map 1000 of the 360-degree video is generated based on the POV selected by the user to be used as the front camera.

In accordance with an example embodiment, 6 identical copies of the project's 360-degree composition are created, one corresponding to each face of the cube map 1000 for the new 360-degree video. In accordance with an example embodiment, the orientation of the faces of the 6 compositions correspond to the orientation of the POV, 90 degrees up from the selected POV, 90 degrees down from the selected POV, 90 degree left from the selected POV and 90 degrees right from the selected POV, and behind the selected POV. In accordance with an example embodiment, each composition is aligned with its corresponding face and then resized to a single cube face's size based on the selected resolution. In accordance with an example embodiment, each composition is resized to the selected resolution divided by three. In accordance with an example embodiment, the 6 compositions are then placed in a new cube map 1000. In accordance with an example embodiment, where the desired output is other than a cube map 1000, the cube map 1000 is then converted into the desired format.

In accordance with an example embodiment, the 360-degree video post-production application 172 uses the processor 140, the GPU 141 or a combination of the processor 140 and GPU 141 to generate a new 360-degree video 214 from the project. In accordance with an example embodiment, the 360-degree video post-production application 172 can save the newly generated 360-degree video in the project data 127 file. In accordance with an example embodiment, the 360-degree video post-production application 172 can save the newly generated 360-degree video as a separate file in the system's 101 data storage devices 142, on an external hard drive connected through the I/O subsystem 150 or serial port 152, in a camera's 160 internal memory, in other persistent memory connected to the system 101, or the new 360-degree video may be sent through an external communication link or interface.

In accordance with an example embodiment, a user may generate a new 360-degree video 214 using a stabilized POV. The new generated 360-degree video will then also be stabilized.

As shown in FIG. 2, in accordance with an example embodiment, after creating a new project 200, a user can decide to do any type of post-production editing on the project, including adding a 360 pass 215, adding a PIP 216, adding a POV 217, adding tracking 218, generating a new 360 degree video 214 or rendering a POV 219. In accordance with an example embodiment, the user can decide to apply further post-production editing of any type. In accordance with an example embodiment, the user can perform more than one type of post-production editing or more than one instance of a particular type of post-production editing.

In accordance with an example embodiment, a user may add multiple POVs 217 and then render those POVs 218. Those rendered POVs can then be provided to other users who will edit the rendered POVs in different video post-production applications 125 or other video post-productions systems. Once the users have completed editing the rendered POVs, the edited rendered POVs can be added back into the project as Media PIPs by adding PIPs 216.

In accordance with an example embodiment, aspects of the 360-degree video post production may be implemented on one or more applications 125 which interact with the 360-degree video post-production application 172. In accordance with an example embodiment, the 360-degree video post-production application 172 is a software plug-in providing 360-degree video post-production features to a video post-production application 125.

While some of the present embodiments are described in terms of methods, a person of ordinary skill in the art will understand that present embodiments are also directed to various apparatus such as processors, servers and communication networks including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

In the Figures, as applicable, at least some or all of the illustrated subsystems or blocks may include or be controlled by a processor, which executes instructions stored in a memory or computer readable medium.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features, which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A method for 360-degree video post-production, the method being performed by at least one processor, the method comprising:

displaying an interface screen for a 360-degree composition on an output interface device comprising a display, the interface screen configured to display an omni directional camera viewer that is configured to display a rectilinear view of the 360-degree composition as a consequence to orientation navigating through the omni directional camera viewer;

identifying a point of view comprising receiving selection through the interface screen of a rectilinear view displayed in the interface screen;

applying video post-production editing to the identified point of view, comprising tracking the identified point of view to identify tracking information comprising one or more point cloud layers and a tracked camera layer;

linking the one or more point cloud layers to the tracked camera layer;

aligning the one or more point cloud layers with the identified point of view in the 360-degree composition;

identifying a further point of view comprising receiving selection through the interface screen of a further rectilinear view displayed in the interface screen;

said applying video post-production editing further being applied to the further point of view and further comprising tracking the further point of view to identify secondary tracking information comprising one or more secondary point cloud layers and a secondary tracked camera layer;

linking the one or more secondary point cloud layers to the secondary tracked camera layer;

aligning the secondary tracked camera layer with the identified further point of view;

scaling the secondary tracked camera layer position parameters to match position parameters of the tracked camera layer; and saving one or more layers, comprising the points cloud layers and the tracked camera layers, to memory.

2. A method for 360-degree video post-production in accordance with claim 1, further comprising:

identifying an existing or additional point of view;

said applying video post-production editing comprising video post-production editing of the identified existing or additional point of view to create one or more additional layers;

aligning the one or more additional layers with the identified existing or additional point of view in the 360-degree composition; and saving the one or more additional layers to memory.

3. A method for 360-degree video post-production in accordance with claim 2, wherein:

said applying video post-production editing comprises importing media of a media file.

4. A method for 360-degree video post-production in accordance with claim 3, wherein the media file is a 360-degree media file of 360-degree footage take from a 360-degree camera.

5. A method for 360-degree video post-production in accordance with claim 2, further comprising rendering a new 360-degree video file which renders the 360-degree composition together with the one or more layers, and saving the new 360-degree video file to the memory.

6. A system for 360-degree video post-production in accordance with claim 5, wherein the new 360-degree video file is rendered by flattening all of the one or more layers in the 360-degree composition.

7. A method for 360-degree video post-production in accordance with claim 2, wherein the video post-production editing comprises:

generating a sub-composition of the identified existing or additional point of view; and said applying video post-production editing comprises applying rectilinear post-production editing to the sub-composition.

8. A method for 360-degree video post-production in accordance with claim 1, further comprising:

orienting the 360-degree composition with an inversion of an orientation of the tracked camera layer; and updating an orientation of the identified point of view to match the orientation of the tracked camera layer after the tracked camera layer is aligned with the identified point of view.

9. A method for 360-degree video post-production in accordance with claim 8, further comprising:

selecting one or more points of view in addition to the identified point of view;

calculating a difference in orientation between the selected one or more points of view and the identified point of view before the orientation of the identified point of view is updated to match the orientation of the tracked camera layer; and updating the orientation of the one or more selected points of view to match the addition of the calculated difference and the orientation of the tracked camera layer after the tracked camera layer is aligned with the identified point of view.

10. A method for 360-degree video post-production in accordance with claim 1, wherein said orientation navigating and/or said receiving selection are controlled using an input interface device.

11. A method for 360-degree video post-production in accordance with claim 1, wherein the displayed rectilinear view is also the consequence of navigating one or more of the angle of view and focal length.

12. A method for 360-degree video post-production in accordance with claim 1, wherein the displayed rectilinear view is generated by identifying and displaying a subset of the 360-degree composition corresponding to the displayed rectilinear view.

13. A method for 360-degree video post-production in accordance with claim 1, wherein the identified point of view includes a particular focal length, angle of view, and orientation of the 360-degree composition.

14. A method for 360-degree video post-production in accordance with claim 1, wherein the identified point of view is selectable from any viewing angle.

15. A method for 360-degree video post-production in accordance with claim 1, further comprising stabilizing the 360-degree composition based on the tracking information.

16. A method for 360-degree video post-production in accordance with claim 1, further comprising outputting the 360-degree composition together with the one or more layers to a 360-degree display.

17. A method for 360-degree video post-production in accordance with claim 1, wherein said scaling further comprises scaling the one or more secondary point cloud layers based on said secondary tracked camera layer position parameters.

18. A system for 360-degree video post-production, comprising:

memory;

an output interface device comprising a display;

an input interface device;

a processor operably coupled to the memory, the output interface device and the input interface device, the processor for executing instructions stored in the memory which, when executed, causes the processor to perform:

displaying an interface screen for a 360-degree composition on an output interface device comprising a display, the interface screen configured to display an omni directional camera viewer that is configured to display a rectilinear view of the 360-degree composition as a consequence to orientation navigating through the omni directional camera viewer;

identifying a point of view comprising receiving selection through the interface screen of a rectilinear view displayed in the interface screen;

applying video post-production editing to the identified point of view, comprising tracking the identified point of view to identify tracking information comprising one or more point cloud layers and a tracked camera layer;

linking the one or more point cloud layers to the tracked camera layer;

aligning the one or more point cloud layers with the identified point of view in the 360-degree composition;

identifying a further point of view comprising receiving selection through the interface screen of a further rectilinear view displayed in the interface screen;

said applying video post-production editing being applied to the further point of view and further comprising tracking the further point of view to identify secondary tracking information comprising one or more secondary point cloud layers and a secondary tracked camera layer;

linking the one or more secondary point cloud layers to the secondary tracked camera layer;

aligning the secondary tracked camera layer with the identified further point of view;

scaling the secondary tracked camera layer position parameters to match position parameters of the tracked camera layer; and saving one or more layers, comprising the points cloud layers and the tracked camera layers, to memory.

19. A non-transitory computer readable medium comprising instructions for 360-degree video post-production and executable by one or more processors, the instructions comprising instructions to perform:

displaying an interface screen for a 360-degree composition on an output interface device comprising a display, the interface screen configured to display an omni directional camera viewer that is configured to display a rectilinear view of the 360-degree composition as a consequence to orientation navigating through the omni directional camera viewer;

identifying a point of view comprising receiving selection through the interface screen of a rectilinear view displayed in the interface screen;

applying video post-production editing to the identified point of view, comprising tracking the identified point of view to identify tracking information comprising one or more point cloud layers and a tracked camera layer;

linking the one or more point cloud layers to the tracked camera layer;

aligning the one or more point cloud layers with the identified point of view in the 360-degree composition;

identifying a further point of view comprising receiving selection through the interface screen of a further rectilinear view displayed in the interface screen;

said applying video post-production editing being applied to the further point of view and further comprising tracking the further point of view to identify secondary tracking information comprising one or more secondary point cloud layers and a secondary tracked camera layer;

linking the one or more secondary point cloud layers to the secondary tracked camera layer;

aligning the secondary tracked camera layer with the identified further point of view;

scaling the secondary tracked camera layer position parameters to match position parameters of the tracked camera layer; and saving one or more layers, comprising the points cloud layers and the tracked camera layers, to memory.

* * * * *

UNITED STATES PATENT AND TRADEMARK OFFICE
CERTIFICATE OF CORRECTION

PATENT NO. : 9,959,905 B1  
APPLICATION NO. : 15/588073  
DATED : May 1, 2018  
INVENTOR(S) : Michel Sevigny Page 1 of 1

It is certified that error appears in the above-identified patent and that said Letters Patent is hereby corrected as shown below:

In the Claims

Column 22, Lines 65-66, "scaling the secondary tracked camera layer position parameters" should read --scaling positions parameters of the secondary tracked camera layer--.

Column 23, Line 1, "points cloud" should read --point cloud--; Line 21, "take" should read --taken--; and Line 28, "system" should read --method--.

Column 25, Lines 1-2, "scaling the secondary tracked camera layer position parameters" should read --scaling positions parameters of the secondary tracked camera layer--; and Line 4, "points cloud" should read --point cloud--.

Column 26, Lines 18-19, "scaling the secondary tracked camera layer position parameters" should read --scaling positions parameters of the secondary tracked camera layer--; Line 21, "points cloud" should read --point cloud--.

Signed and Sealed this  
Fifth Day of June, 2018

Andrei Iancu  
*Director of the United States Patent and Trademark Office*